US006952632B2

United States Patent
Robert et al.

(10) Patent No.: US 6,952,632 B2
(45) Date of Patent: Oct. 4, 2005

(54) METHOD OF GUIDING AN AIRCRAFT IN THE FINAL APPROACH PHASE AND A CORRESPONDING SYSTEM

(75) Inventors: Paul Henry Robert, Toulouse (FR); Guy Juanole, Colomiers (FR); Michel Devy, Toulouse (FR)

(73) Assignee: Airbus (FR)

( * ) Notice: Subject to any disclaimer, the term of this patent is extended or adjusted under 35 U.S.C. 154(b) by 0 days.

(21) Appl. No.: 10/350,663

(22) Filed: Jan. 24, 2003

(65) Prior Publication Data

US 2003/0225487 A1 Dec. 4, 2003

(30) Foreign Application Priority Data

Jan. 25, 2002 (FR) .............................. 02 00928

(51) Int. Cl.$^7$ .............................................. G06F 15/50
(52) U.S. Cl. .............................. 701/16; 701/1; 701/28; 701/223; 340/951; 342/33; 73/178 T
(58) Field of Search ................................ 701/1, 16, 17, 701/18, 28, 223; 244/183; 340/951; 342/33; 73/178 T

(56) References Cited

U.S. PATENT DOCUMENTS

| | | | |
|---|---|---|---|
| 4,866,626 A | 9/1989 | Egli | 701/207 |
| 5,235,513 A | 8/1993 | Velger et al. | 701/16 |
| 6,157,876 A | * 12/2000 | Tarleton et al. | 701/16 |
| 6,211,809 B1 | * 4/2001 | Stiles | 342/33 |

FOREIGN PATENT DOCUMENTS

| | | |
|---|---|---|
| DE | 195 21 600 A1 | 12/1996 |
| FR | 2 808 588 A1 | 11/2001 |
| JP | 06135392 | 5/1994 |

* cited by examiner

*Primary Examiner*—Thomas G. Black
*Assistant Examiner*—Arthur D. Donnelly
(74) *Attorney, Agent, or Firm*—VanOphem & VanOphem, P.C.

(57) ABSTRACT

A method of guiding an aircraft in the final approach phase including imaging the ground using an imaging system onboard the aircraft to obtain an image, analyzing the image to detect an airport area, detecting an airport area and selecting a runway for landing, tracking the selected runway during the approach of the aircraft by visually tracking the selected runway in the image supplied by the imaging system, and tracking the runway when the aircraft is very close to the ground by analyzing the image supplied by the imaging system to determine the position of the aircraft relative to the runway.

18 Claims, 4 Drawing Sheets

IMAGE

IMAGE

GROUPING OF PAIRS

IMAGE

PROCESSED IMAGE
SHOWING GROUPS

METHOD OF GUIDING AN AIRCRAFT IN THE FINAL APPROACH PHASE AND A CORRESPONDING SYSTEM

FIELD OF THE INVENTION

The present invention relates to a method of guiding an aircraft in the final approach phase during landing and a system for implementing the method.

DESCRIPTION OF THE PRIOR ART

Guidance systems for assisting aircraft navigation and guidance exist already. The existing systems are known as ILS, MLS, GPS, APALS.

The instrument landing systems (ILS) uses radio beacons installed along an approach path to an airport and corresponding receivers installed onboard the aircraft. The receivers cooperate with instrument indicators informing the pilot of his position relative to an ideal trajectory. The indicators include a horizontal pointer and a vertical pointer and by keeping the two pointers centered the pilot can maintain his aircraft aligned with the center line of the runway and maintain a rate of descent that is as constant as possible until touch-down.

The microwave landing systems (MLS) works in substantially the same way as the ILS, but uses microwaves instead of radio beams. Because of this, the MLS is more immune than the ILS to stray signals reflected from buildings around the runway.

A number of systems use the Global Positioning System (GPS) technology. These systems use a constellation of satellites in orbit around the Earth. An instrument onboard the aircraft determines its position by measuring its distance from a number of satellites whose position is known. By correlating the position of the aircraft and that of the runway, assistance can be provided to the pilot. Many aircrafts are already using GPS information as a supplementary navigation aid (in addition to standard systems such as inertial navigation systems). However, systems using the GPS are not accurate enough to guide an aircraft in the final approach phase. The accuracy of systems using the GPS is of the order of ten meters, which is insufficient to guarantee that an aircraft will set down on a runway and not alongside it.

The basic version of the autonomous precision approach landing systems (APALS) is autonomy. Its theory is based on the use of fixed antennas and meteorological radar. The system uses meteorological radar images and its own knowledge of the terrain to determine the position and the altitude of the aircraft. The system can be combined with an ILS and/or the GPS. A system like APALS has not yet been installed on an operational aircraft.

The main disadvantage of the above systems is that they all require installations on the ground. Although APALS is an autonomous system, ground installed fixed external antennas are needed.

An object of the present invention is to provide a guidance method in the final approach phase that is entirely autonomous and requires no dedicated installation on the ground to land an aircraft.

SUMMARY OF THE INVENTION

It is an object of the present invention to propose a method of guiding an aircraft during the final approach phase, utilizing the following steps:

a) imaging the ground, using an imaging system onboard the aircraft to obtain an image;

b) analyzing the image to detect an airport facility;

c) detecting an airport facility and selecting a runway for landing;

d) tracking the selected runway during the approach of the aircraft by visually tracking the selected runway in the image supplied by the imaging system; and e) tracking the runway when the aircraft is very close to the ground by analyzing the image supplied by the imaging systems to determine the position of the aircraft relative to the runway.

A method of the above kind assists the pilot in the final approach phase, without requiring means external to the aircraft, or alternatively can supply information to an automatic pilot in order to perform an automatic landing.

In the above guidance method, the steps are preferably executed in the order indicated, from a) to e). However, the order in which these steps are executed can be modified, as required. For example, if the runway is lost during the tracking step d), the system can be reinitialized by returning to step b).

A novel way to perform step b) of the guidance method defined hereinabove is proposed. It consists of recognizing in 2D image segments that are parallel in the 3D space represented. It is well known that, when photographed, two parallel lines in a 3D space are not usually parallel in the resulting 2D photo. A novel way of identifying parallel lines in space in a two-dimensional image is proposed here. In step b) of the guidance method recited above, the analysis can be carried out by seeking substantially parallel straight line segments in the image and a runway detected by pairing straight line segments. This is novel in itself. Of course, this way of identifying a runway could be adapted in identifying other objects characterized by parallel lines space.

The search for parallel segments is preferably effected by regularly dividing the range of all possible directions $[-\pi/2; \pi/2]$ into N classes and associating each segment with a class, two segments then being considered to be parallel if they belong to the same class. Supplementary conditions can then be defined for considering two parallel segments of the image to correspond to two parallel segments in space. Thus two parallel segments are retained if the following conditions are met, for example:

the segments belong to the same class of directions;

each of the segments has a minimum length;

the segments are face-to-face with a minimum overlap; and the distance between the segments is less than a predetermined value.

The above conditions are particularly well suited to searching for an airport area in a 2D image taken from an aircraft in flight at a distance from the area. Other conditions can be chosen to search for other objects characterized by parallel segments in 3D space.

To improve the search for an airport area (or any other object), determining a vanishing point for each pair of substantially parallel segments, i.e. the theoretical point of intersection of the two parallel segments, and grouping two pairs of segments together if the distance between the corresponding two vanishing points is below a predetermined threshold can be envisaged.

In the guidance method defined above, step d) of tracking the runway uses a visual tracking method, for example, which includes the following steps:

d1) initialization: the selected runway is extracted from the image and modeled and a window in which the runway has been found is defined;

d2) prediction: the position of the runway in the current image is predicted as a function of the position occupied in the preceding image and a corresponding window is defined;

d3) extraction of characteristics: a suitable representation of contours and/or points of interest of the window is supplied;

d4) pairing: the runway is searched for in the window as a function of the prediction; and d5) if necessary, the representation of the runway and/or the speed of apparent movement of the runway is updated;

and the steps d2) to d5) are executed iteratively.

In the present context of runway tracking in the aircraft final approach phase, the prediction step can be omitted.

The runway is tracked by step e) by analyzing in the current image the color and the texture of its pixels in order to classify the pixels as belonging to the runway or not.

In another embodiment of the guidance method according to the invention, the runway can be tracked in step e) by searching the image for the edge of the runway and/or markings on the runway.

The passage from step d) to step e) can be made subject to a predetermined condition. For example, the passage from step d) to step e) can be effected if the runway threshold is no longer visible on the images. It is assumed here that the runway has two parallel longitudinal edges connected at one end by a threshold.

The present invention also provides a system for guiding an aircraft in the final approach phase, including a computer and a display in the cockpit of the aircraft and a video camera connected to the computer, which has means for acquiring and processing video images and is connected to the display in the cockpit.

The video camera used is advantageously a charge coupled device (CCD) video camera.

In a preferred embodiment, the guidance system includes two or more video cameras.

Each video camera is preferably connected to the computer by an optical fiber link.

To enable automatic landing, the computer is advantageously connected to an automatic pilot.

Finally, the present invention also provides an aircraft including a guidance system as defined above.

Details and advantages of the present invention will emerge more clearly from the following description, which refers to the accompanying diagrammatic drawings.

DETAILED DESCRIPTION OF THE PREFERRED EMBODIMENT OF THE INVENTION

The following description concerns the application of video camera perception to an automatic aircraft landing function, for example for use by civil aircraft. The method and the system described hereinafter provide an aircraft pilot with an automatic final approach system making his aircraft as autonomous as possible vis à vis the exterior environment of the aircraft. In video images acquired by means of a video camera and processed by a computer, lateral and vertical aircraft errors are extracted in order to send this information to an automatic pilot and control system of the aircraft. The present invention is more particularly concerned with the perception aspects, i.e. the acquisition and processing of the image, rather than the control aspects, various options for which can be envisaged. A first option is for the pilot of the aircraft to act as the comparator and to control the aircraft as a function of visual information received by the landing aid system. A second option is a completely automatic solution in which the landing aid system is coupled to an automatic pilot. These two possibilities exist already with prior art instrument landing systems (ILS).

Figure 2:
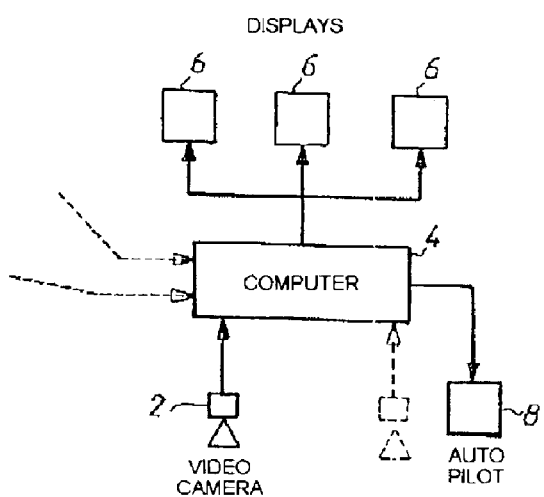
FIG. 2 is a diagram of a system for implementing the method shown diagrammatically in FIG. 1.

A preferred embodiment shown in FIG. 2 of a system according to the invention for assisting the pilot in the final approach phase includes a video camera 2, a computer 4, displays 6, and an automatic pilot 8.

The present invention requires only one video camera. However, as is usual in aeronautical systems, it is preferable to have a second video camera in case of failure of the first video camera. The second video camera is shown in dashed outline in FIG. 2. Each video camera 2 is a charge coupled device (CCD) video camera. An optical fiber connects each video camera 2 to the computer 4. The computer 4 is a video camera interface unit (CIU). The video camera 2 includes means for compressing to the MJPEG standard video images that it transmits to the computer 4. Each video camera 2 utilizes visible lights. A video camera 2 is preferably chosen that has the highest possible immunity to variations in illumination due to the weather, the time of day, fog, rain, etc. The system can have an all-weather capability or not, depending on the quality of the video camera.

The role of the CIU computer is to acquire video signals of the MJPEG format from the video camera(s) 2, decompress the images, and process them as described below. The computer also sends images to the display 6 and information to the automatic pilot 8. The dashed line arrows on the left in FIG. 2 indicated that the computer is also connected to other components of the aircraft such as an inertial navigation system or radio system.

The displays 6 are of the same type as are generally found in an aircraft cockpit. They are normally used to collect data concerning the aircraft (altitude, navigation, alarms, system). In the present system, the displays are also designed to receive video images. FIG. 2 shows three displays 6 that can receive video images. It is thus assumed that in the aircraft equipped with the system according to the invention at least three of the six displays generally available in an aircraft are capable of displaying video images. Each of the displays is connected to the computer 4 by an avionic bus link.

The automatic pilot calculates and applies to the aircraft, control laws responsive to the error measured by the computer 4 so as to correct any deviation from the target point, which is the point of touch-down of the aircraft on the runway, if the information supplied by the navigation aid system must accommodate the entire automatic landing.

Figure 1:
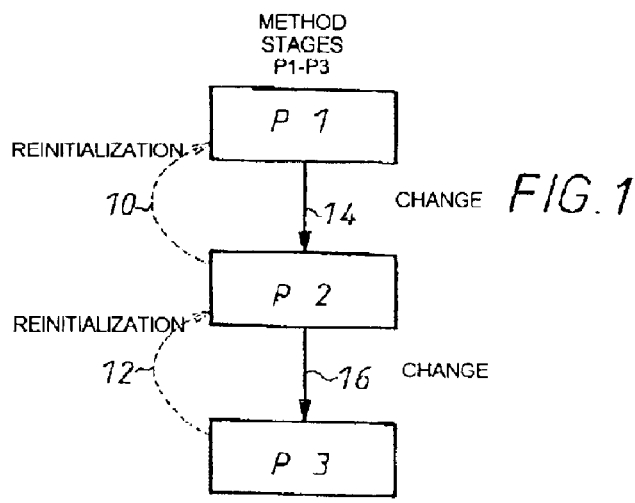
FIG. 1 is a general flowchart of a method in accordance with the invention.

FIG. 1 is a block diagram showing the basic principle of the invention, namely dividing the final approach phase into three separate phases. The first phase is initialized when the aircraft is still a few kilometers from the runway, for example 4 to 5 km. This first phase P1 identifies an airport area or facility in an image captured by an onboard video camera 2. When the airport area has been detected, a second phase P2 begins and identifies in subsequent images the airport area detected during phase P1. As the aircraft approaches the airport area, the latter occupies more and more of the image supplied by onboard video camera 2, until it eventually moves outside the frame of the image. At this point a third phase P3 begins, during which the position of the aircraft is determined relative to the runway, which is now very close. During this last phase, the aircraft is soaring over the runway or is only a few meters above it.

A dashed line arrow 10 in FIG. 1 indicates that reinitialization (a return from phase P2 to phase P1) is possible. If during phase P2 the system fails to track the runway, the airport area detection phase can again be reinitiated. A dashed line arrow 12 also indicates a second kind of reinitialization, returning from phase P3 to phase P2. This kind of reinitialization is highly safety-critical and should be avoided because, at this time, the aircraft is very close to the runway and for obvious safety reasons it is important for the landing aid system not to lose track of the runway.

As indicated above, the change 14 from phase P1 to phase P2 occurs after the airport area has been detected. The change 16 from phase P2 to phase P3 occurs when a particular condition is satisfied. There can be more than one condition. For example, a first condition maybe selected to correspond to disappearance of the runway threshold from the image supplied by the video camera 2. It is also possible to select the condition that phase P3 is initialized when the aircraft is less than five meters above the runway. Further conditions can be defined.

Figure 3:
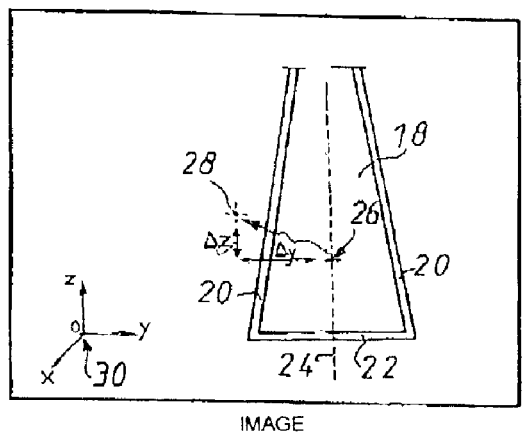
FIG. 3 shows an image on which a runway appears schematically.

FIG. 3 shows the theory of the landing assistance provided by the system and the method according to the invention. This figure represents an image on which only a runway 18 is represented. The runway 18 has two parallel borders 20 which are parallel in reality but which converge toward a vanishing point in the image provided by the video camera 2. The two borders 20 are joined at their base by a strip 22 known as the runway threshold. The runway 18 has a longitudinal axis 24 known as the runway axis. As a function of the position of the runway borders 20 and the threshold 22, a reference point 26 is defined as the theoretical point of touch-down of the aircraft on the runway 18. The reference point 26 is on the runway axis 24. The center of the image 28 corresponds to the point at which the video camera 2 is aimed. As indicated by the reference number 30 in FIG. 3, a system of axes (0, x, y, z) is defined. The axes y and z are in the image plane and the axis x is perpendicular to the image plane. The landing aid system determines the horizontal error $\Delta y$ and the vertical error $\Delta z$ between the reference point 26 and the center of the image 28. In a semiautomatic landing the aircraft pilot views on a display 6 the vertical error $\Delta z$ and the error $\Delta y$ and controls the aircraft as a function of this information supplied by the pilot aid system. In automatic landing mode, the information is supplied to the automatic pilot 8 which then controls the aircraft by attempting to maintain the horizontal and vertical errors as close as possible to the value 0.

To detect the airport area (step P1), the video camera 2 captures an image and sends the image compressed to the MJPEG format to the computer 4. The environment of the airport area can be highly varied. The airport may be surrounded by buildings or in open country, in a desert, on the coast, etc. However, it must be noted that airport areas have highly structured and characteristic elements consisting of the runways and taxiways, which are generally seen against a uniform background (e.g. grass or desert). As seen from an aircraft, an airport area therefore has parallel (slightly convergent) segments that could provide a basis for detecting an area of interest in the image captured by the video camera 2. However, it is necessary to distinguish parallel segments corresponding to an airport area from parallel segments that could result from other elements appearing in an image, i.e. a road, a building, etc.

Figure 4:
FIG. 4 shows by way of example a characteristic segment image extracted from a image produced by a video camera.

A first step in detecting an airport area in an image supplied by the video camera 2 is to extract from that image the 2D segments characteristic of the image. These can be extracted by applying a Sobel filter to the image, for example. FIG. 4 shows by way of example an image obtained after such filtering.

Figure 5:
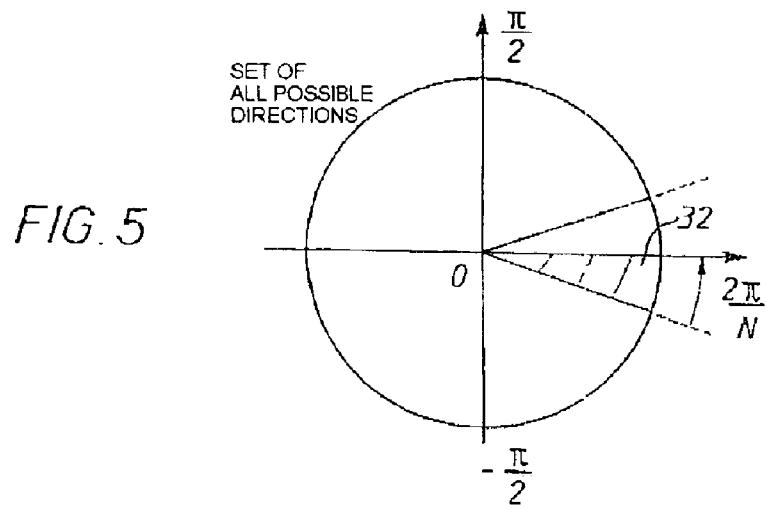
FIG. 5 shows available ranges of directions for searching for pairs of parallel segments.

The segments defined in the preceding step are then classified according to their orientation in the image. The range of all possible directions $[-\pi/2; \pi/2]$ is then divided regularly into any number N of classes. There are then N directions each sweeping out an angle $2\pi N$ (see FIG. 5). The shaded area 32 in FIG. 5 shows the class of directions $[-2\pi/N; 0]$.

Rules are then chosen for determining if two segments can be judged to be locally parallel in the image plane. These rules are as follows, for example:

The two segments must belong to the same class of directions. The parameter N is to be determined. The following choice is made, for example: N=20.

Each segment must have a minimum length $1_{min}$ (for example 25 pixels).

The two segments must be face-to-face with a minimum overlap, greater than a minimum value $T_{min}$ (for example 30%).

The two segments must be close together. The distance between them must be less than a threshold distance $d_{max}$ (for example 40 pixels).

The parameter N and the threshold values $I_{min}$, $T_{min}$ and $d_{max}$ must suit the individual circumstances and are determined empirically. The values depend on the video camera and on the application (here identification of a runway).

Figure 6:
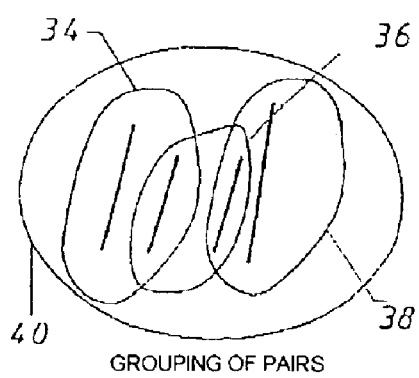
FIG. 6 shows the creation of groups of pairs of parallel segments.

After extraction of pairs of parallel segments, the relationship which unites two pairs of segments is closed transitively by merging them (FIG. 6). Thus groups of pairs of parallel segments are made, each pair of segments of a group having at least one segment common to two pairs of segments of the group. Thus, in FIG. 6, three pairs of segments 34, 36 and 38 have been grouped into a group 40 of parallel pairs. Note that the pair of segments 34 has one segment in common with the pair of segments 36, the pair of segments 36 has one segment in common with the pair 34 and its other segment in common with the pair 38, and the pair 38 has one segment in common with the pair 36.

Figure 7:
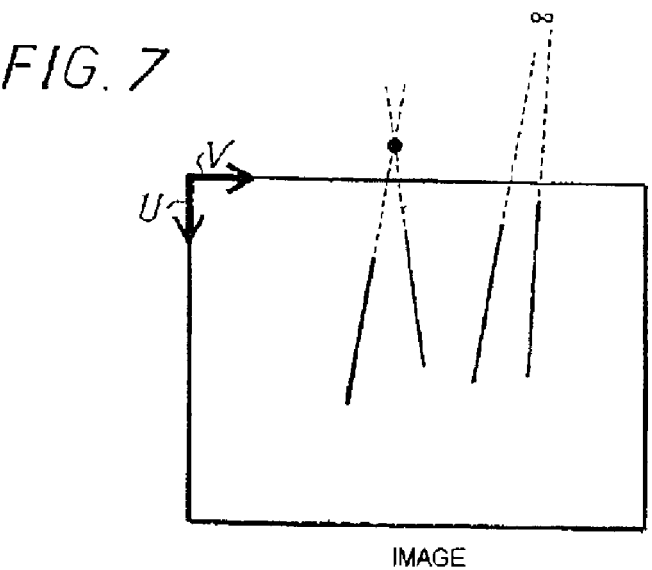
FIG. 7 illustrates the vanishing point concept.

If two parallel lines are photographed on an axis that is not perpendicular to the plane containing the two parallel lines, the image formed by the two parallel lines no longer features their parallel relationship, but forms two lines converging toward a point called the vanishing point. Accordingly, to determine if parallel segments of a group 40 of pairs of segments 34, 36, 38 correspond to parallel lines of the object photographed, all the segments of the groups are considered two by two and a corresponding vanishing point is determined each time (see FIG. 7). The vanishing points are then compared with each other by calculating the Euclidean distance $d_v$ between them. If the $d_v$ measured is below a predetermined threshold $th_v$, then a vanishing group is created formed of four segments. For example, if the vanishing point is very far away or at infinity, the corresponding segments cannot be retained (see FIG. 7).

Figure 8:
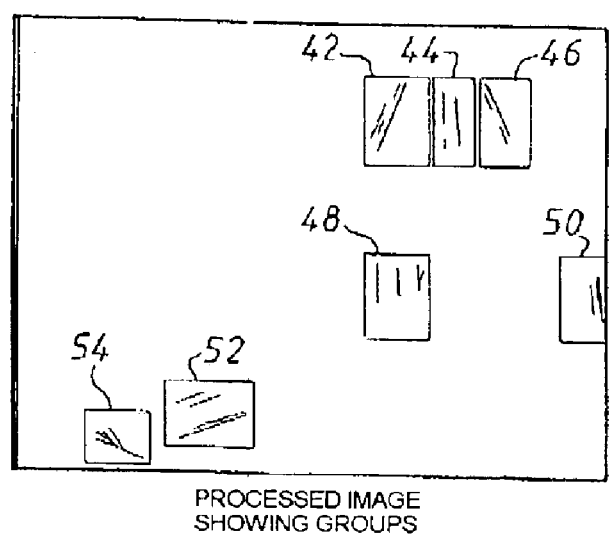
FIG. 8 shows an image corresponding to that shown in FIG. 4 but after processing.

FIG. 8, which corresponds to FIG. 4, shows only the groups of pairs of parallel segments such as the group 40 from FIG. 6. In the entire image there are only seven groups 42, 44, 46, 48, 50, 52 and 54 of this type.

In the same way as groups of pairs of parallel segments are formed, groups of pairs of parallel segments are grouped together if in two separate groups (such as the group 40 in FIG. 6) there appear two segments of the same vanishing group. In the situation shown in FIGS. 4 and 8, the groups 42, 44 and 46 are grouped in this way.

Figure 9:
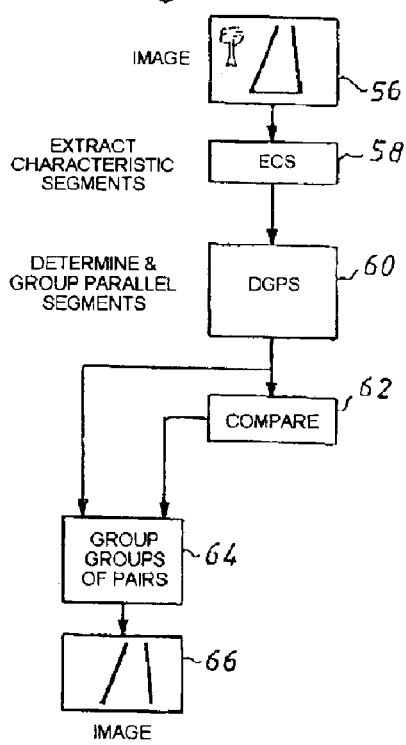
FIG. 9 is a flowchart for a first phase of the FIG. 1 method.

FIG. 9 is a flowchart summarizing the steps of phase P1 as described above. FIG. 9 shows an image 56 obtained by the video camera 2. The image is digitized and sent to the computer 4. A first step 58 extracts characteristic segments using the Sobel gradient filter coupled to a thinning operator and a polygonal interpolation operator. The next step 60 determines in all of the characteristic segments determined in step 58 those which are parallel to each other and then forms groups of pairs of parallel segments. All the segments forming part of any group of pairs of parallel segments are then compared two by two to determine their vanishing point in step 62. The pairs of segments whose vanishing points are close together are then grouped together to produce vanishing groups. Finally, the last step 64 groups the groups of pairs of parallel segments detected in step 60. Two separate groups are grouped together if a vanishing group has segments in both of the groups of pairs of parallel segments. After executing this algorithm, an image 66 is obtained in which appear only the segments that correspond to segments which are parallel in three dimensions. If the threshold values $1_{min}$, $T_{min}$, and $d_{max}$ have been chosen judiciously, there remain in the image 66 only segments corresponding to an airport area. The image 66 may show more than one runway. It is then necessary to determine on which of the runways the aircraft is to land. Runway selection can be automatic, as a function of instructions entered beforehand into the computer 4, or the runway can be chosen by the pilot. In the latter case, displaying the image 66, possibly superimposed on the image 56, on a display 6 in front of the pilot can be envisaged.

When the runway has been selected, it is necessary to recognize it on subsequent images captured by the video camera 2. This is the purpose of phase P2 of the method described here.

Figure 10:
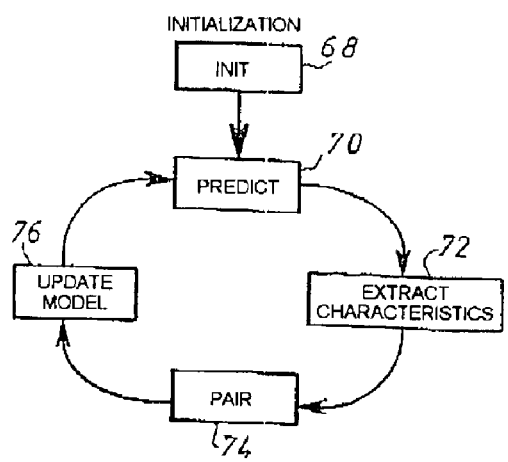
FIG. 10 is a flowchart for a second phase of the FIG. 1 method.

FIG. 10 is a theoretical diagram of visual tracking. The diagram includes an initialization module 68 and four modules that are repeated iteratively.

The initialization module 68 extracts from the current image the visual pattern to be tracked in subsequent images. In this instance, the initial position of the runway is given by the detection phase P1. The result from the initialization module 68 consists of supplying:

an initial model of the target, here the runway, with a form of representation suited to the tracking method (contours or points), and a window in which the object to be tracked (the runway) has been found.

The first module of the loop shown in FIG. 10 is a prediction module 70 which is executed on each iteration to generate the predicted position of the runway in the current image $I_n$ as a function of its position in the preceding image $I_{n-1}$, the image acquisition and processing frequency, and most importantly a model of the apparent dynamics of the runway in the sequence. This model is generally estimated by Kalman filtering. In this instance, the images are 2D images and the apparent movement of the runway in the image is caused by movement of the video camera 2 relative to the fixed runway.

The result from the prediction module 70 is a predicted position of the runway in the image, in the form of a window or a subimage in which subsequent processing is executed. The size of the window or the subimage is a function of the accuracy of the prediction. The accuracy is obtained by an estimation method using a variance matrix on the state of the Kalman filtering system.

The next module is a module 72 for extracting characteristics. The role of this module is to supply an appropriate representation of the subimage in which the object is searched for. This representation must be constructed quickly and must be sufficiently discriminating to search quickly for the tracked runway. For example, the representation uses points of interest and/or contours and/or segments, etc.

The third module shown in the FIG. 10 loop is a pairing module 74. It looks for the runway in the region of interest determined by the predication module 70. Various pairing methods are available: exhaustive method, tree search, relaxation, prediction-verification, etc. In all cases it is necessary to show a measure of similarity between a subset of characteristics extracted from the image and the model of the target. The result from this module consists in a set of pairings (image, model) and a measure of confidence in the pairings.

The last module of the loop shown in FIG. 10 is a module 76 for updating the model of the target. This module updates the representation of the runway and the model of its dynamics (speed of apparent movement, etc.).

Over and above this visual tracking loop, a control loop must be used to verify the coherence of tracking and to deal with errors or drift. The role of this control function is to restart the initialization module if the runway is lost in the sequence. This control function also instigates the change from phase P2 to phase P3.

Visual tracking of this kind can also be used for other applications. In the application for tracking a runway in the final approach phase, the initialization module 68 is partly executed during phase P1 which supplies a set of convergence segments. The module 72 for extracting characteristics is executed on the subimage containing those segments to yield a first model of the runway (set of points, active contours, etc.). The prediction module 70 can be omitted in this instance. It is sufficient to search the text image $I_{n+1}$ for the runway where it was located in the preceding image $I_n$.

Depending on the time needed to perform the various steps of the loop shown in FIG. 10, not all the images from the video sequence are analyzed. The runway is searched for in only one image in n from the sequence, for example one image in three. The higher the value of n, the greater the need for a prediction module 70.

Various techniques can be used to implement the characteristics extraction module 72, pairing module 74, and model updating module 76. They are known to the person skilled in the art and are not described in detail here. Suffice to mention, by way of example, the technique of tracking polygonal contours by 1D correlation along the contours and the contour tracking technique using active contours (snakes) which uses the silhouette of the tracked object. Other methods can also be envisaged in this tracking phase.

The last phase P3 is very similar to what is already available in the road context, in that the aircraft is soaring along the runway or is only a few meters above it. The white lines at the sides and along the center of the runway appear clearly in the image, imperfections of the asphalt are visible, and it becomes possible to discriminate the texture of the various elements constituting the scene (grass, concrete, soil, etc.).

In the road context, sequences of images stored from video cameras mounted in a moving vehicle are evaluated. The image sequences supply information on the environment of the vehicle that is analyzed to assist the driver in real traffic situations. In the road context, the object of analyzing the images is to find the position of the vehicle relative to the road. The same applies in the case of the aircraft on the runway, i.e. its position relative to the runway must be found.

Two approaches are routinely used. A first approach is based on classifying pixels of the image to detect regions (grass, concrete, etc.) and another approach is based on a geometrical model of the road based on discontinuities extracted from the image.

Figure 11:
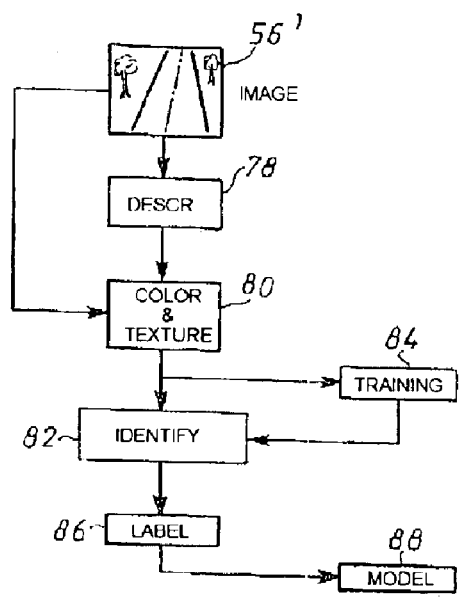
FIG. 11 shows a flowchart which can be used for a third phase of the FIG. 1 method.

An algorithm for implementing phase P3 based on analyzing regions is described hereinafter by way of example and illustrated in FIG. 11. It is an algorithm for segmenting and characterizing regions of the image 56'. It consists of four major steps described below.

The first step 78 must rapidly supply a synthesized description of the scene. It is performed on a low-resolution image 56'. The image is partitioned a first time by dividing it into square cells of 2×2 pixels. Classes are defined by analyzing chromatic attribute histograms. Each cell is associated with a class obtained by dividing the color space. The basic cells are merged using an adjacence graph (of connectivity 4). Finally, regions smaller than a given threshold are merged with the adjacent region having the closest homogeneity criterion value.

Each region resulting from the first step (color segmentation) is then characterized by its color and its texture (step 80). Although the statistical average of the pixels constituting it is used to characterize a region in accordance with its colorimetric attributes, texture attribute measurement is based on sum and difference histograms. The attributes generated by these histograms are the mean, variance, energy, entropy, contrast and, finally, homogeneity.

Two techniques are used to identify the elements (regions) present in the image (step 82): the Bayesian technique which performs the classification using all of the attributes without partitioning the characteristics space, and the hierarchical technique based on an algorithm that sufficiently partitions the characteristics space (attribute selection intrinsic capacity). For this identification, a training base 84 is used which is constructed as a function of application of the present algorithm.

Each region of the image is matched to its nature in the last (labeling) stage 86. Although color segmentation supplies large regions, they do not necessarily correspond to the large components of the scene. A merging step is therefore necessary to group all of the connected regions in the scene.

Running this algorithm produces a nominative model 88 of the various regions appearing in the image 56' and identified during this phase. This enables the position of the aircraft relative to the runway to be determined.

The system and the method described hereinabove provide a system for guiding an aircraft in the final approach phase that is autonomous with regard to any type of installation external to the aircraft. In a manner that is novel in itself, the system measures errors relative to an ideal approach trajectory based on perceptual processing of images transmitted by a system of one or more video cameras onboard the aircraft. Perception algorithms for the three phases of the algorithm shown in FIG. 1 are described above.

With regard to detection of the airport area (phase P1), a new and novel algorithm based on extracting perceptual groups has been described. This algorithm has also been tested and has yielded good results. It determines in a 2D image of a 3D object segments that correspond to lines that are parallel in space.

The runway tracking phases (P2 and P3) have also been tested. With regard to phase P2, the two algorithms described by way of example above have been tested and have yielded good results. For the last phase of the method according to the invention, the test was conducted using a training base intended for a different application. Nevertheless, the results obtained are encouraging. It should be noted here that the algorithm used and described is derived from the field of robotics. Other algorithms from the field of road tracking by a vehicle, which have already been proven, can also be used in step P3.

The present invention is not limited to the various embodiments described above by way of non-limiting example, but also encompasses all variants that will be evident to a person skilled in the art within the scope of the following claims.

What is claimed is:

1. A method of guiding an aircraft in the final approach phase of a landing, said method of guiding comprising the steps of:
   a) imaging the ground using only an onboard imaging system to obtain an image;
   b) analyzing said image to define an airport area;
   c) detecting said airport area and repeating said detecting step until a runway is selected for landing;
   d) tracking said selected runway during the approach of said aircraft by visually tracking said selected runway in said image supplied by said onboard imaging system; and
   e) tracking said runway when said aircraft is very close to the ground by analyzing said image supplied by said onboard imaging system to determine the position of said aircraft relative to said runway.

2. The method as claimed in claim 1 wherein a reinitialization consisting of a return to step b) is effected if said runway is lost during tracking step d).

3. The method as claimed in claim 1 wherein said analyzing step b) is conducted by searching said image for substantially parallel straight line segments to identify said runway by pairing such straight line segments.

4. The method as claimed in claim 3 wherein said substantially parallel straight line segments are searched for by regularly dividing the range of all possible directions into classes and associating each segment with a class whereby two segments are considered to be parallel if they belong to the same class.

5. The method as claimed in claim 4 wherein two parallel segments are retained if the following conditions are satisfied:

said two segments belong to the same class of directions;

each of said two segments has a minimum length;

said two segments are face-to-face with a minimum overlap; and the distance between said two segments is less than a predetermined value.

6. The method as claimed in claim 5 wherein a vanishing point consisting of the theoretical point of intersection of two substantially parallel straight line segments is determined for each pair of parallel straight line segments and two pairs of straight line segments are grouped together if the distance between the two corresponding vanishing points is less than a predetermined threshold.

7. The method as claimed in claim 1 wherein said runway tracking step d) further comprises the steps of:

d1) initialization: the selected runway is extracted from the said image and modeled and a window in which said runway has been found is defined;

d2) prediction: the position of said runway in the current image is predicted as a function of the position occupied in the preceding image and a corresponding window is defined;

d3) extraction of characteristics: a suitable representation of contours and/or points of interest of said window is supplied;

d4) pairing: said runway is searched for in said window as a function of said prediction; and d5) if necessary, said representation of said runway and/or the speed of apparent movement of said runway is updated;

and said steps d2) to d5) are executed iteratively.

8. The method as claimed in claim 1 wherein said runway tracking set forth in step e) is conducted by analyzing the color and texture of the pixels of the current image in order to classify said pixels as belonging to said runway or not.

9. The method as claimed in claim 1 wherein said step of tracking said runway in step e) further comprises the step of searching said image for the edge of said runway and/or markings on said runway.

10. The method as claimed in claim 1 wherein the change from step d) to step e) occurs if a predetermined condition is satisfied.

11. The method as claimed in claim 10 wherein said runway has two parallel longitudinal edges connected at one end by a transverse threshold and said change from step d) to step e) occurs when said threshold is no longer visible on said image.

12. A system from guiding an aircraft in the final approach phase, including a computer and a display in the cockpit of said aircraft and a video camera connected to said computer, which has means for acquiring and processing video images and for implementing a method as claimed in claim 1 and is connected to said display in said cockpit.

13. The system claimed in claim 12 wherein said video camera is a charge coupled device video camera.

14. The system claimed in claim 12 wherein said video camera is connected to said computer via an optical fiber link.

15. The system claimed in claim 12 including two video cameras.

16. The system claimed in claim 15 wherein each video camera is connected to said computer via an optical fiber link.

17. The system claimed in claim 12 wherein said computer is connected to an automatic pilot.

18. An aircraft including a guidance system as claimed in claim 12.

* * * * *

UNITED STATES PATENT AND TRADEMARK OFFICE
CERTIFICATE OF CORRECTION

PATENT NO. : 6,952,632 B2 Page 1 of 1
APPLICATION NO. : 10/350663
DATED : October 4, 2005
INVENTOR(S) : Paul Henry Robert et al.

It is certified that error appears in the above-identified patent and that said Letters Patent is hereby corrected as shown below:

<u>Column 3,</u>
Line 57, delete "schematically," and insert -- schematically; --.

<u>Column 5,</u>
Line 64, before "error $\Delta y$", insert -- horizontal --.

<u>Column 6,</u>
Line 18, delete "image,i.e." and insert -- image, i.e. --.
Line 54, delete "Thus" and insert -- Thus, --.

<u>Column 12,</u>
Line 14, delete "from" and insert -- for --.

Signed and Sealed this

Fourth Day of July, 2006

JON W. DUDAS
*Director of the United States Patent and Trademark Office*